US010333922B1

(12) United States Patent
Sharifi Mehr (10) Patent No.: US 10,333,922 B1
(45) Date of Patent: *Jun. 25, 2019

(54) TECHNIQUES FOR NETWORK SITE VALIDATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,878

(22) Filed: Jul. 24, 2017

Related U.S. Application Data

(63) Continuation of application No. 13/965,415, filed on Aug. 13, 2013, now Pat. No. 9,742,758.

(51) Int. Cl.
*H04L 9/00* (2006.01)
*H04L 29/06* (2006.01)

(52) U.S. Cl.
CPC ............................. *H04L 63/0823* (2013.01)

(58) Field of Classification Search
CPC ................................................ H04L 63/0823
See application file for complete search history.

(56) References Cited

U.S. PATENT DOCUMENTS

| 7,725,930 B2 * | 5/2010 | Lawrence | H04L 63/126 |
| | | | 713/175 |
| 9,083,696 B1 * | 7/2015 | Khaitan | H04L 63/0823 |
| 2012/0216242 A1 * | 8/2012 | Uner | G06F 21/50 |
| | | | 726/1 |

* cited by examiner

*Primary Examiner* — Beemnet W Dada
(74) *Attorney, Agent, or Firm* — Thomas | Horstemeyer, LLP (57) ABSTRACT

Disclosed are various embodiments for validating the identity of network sites. A communication session is established with a network site using a credential for the network site. A validation of the communication session is generated based at least in part upon a profile for the network site. The profile is derived from at least one previous communication session with the network site. An action is initiated in response to the validation when the validation indicates a discrepancy exists between the profile for the network site and the communication session with the network site.

20 Claims, 5 Drawing Sheets

TECHNIQUES FOR NETWORK SITE VALIDATION

CROSS-REFERENCE TO RELATED APPLICATION

This application is a continuation of U.S. patent application Ser. No. 13/965,415, filed Aug. 13, 2013 and entitled TECHNIQUES FOR NETWORK SITE VALIDATION, which is hereby incorporated by reference herein in its entirety.

BACKGROUND

In an age of information, people may exchange data over communication sessions that may traverse various networks. Traditional data security architectures suffer from vulnerabilities that may compromise the confidence of the authentication operations performed. Those participating in the communication session may wish to take additional measures to ensure the communication session is carried out with the intended parties.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to techniques for validating the identity of network sites with which a communication session is established. During a communication session between a client and a network site, the network site exhibits characteristics that may be used as a "fingerprint" with which to identify the network site. The identity of the network site may be validated by comparing the observed characteristics of the network site with characteristics specified by a predefined profile for the network site. The profile may describe characteristics observed from prior communication sessions with the network site, as well as characteristics that may be independent of historical observations.

An action may be initiated in response to suspect characteristics identified during the validation of the network site. The suspect characteristics may include discrepancies identified between the characteristics of the current communication session and the previously observed characteristics, as well as similarities between the characteristics of the current communication session and generally known characteristics indicating the network site may have security vulnerabilities. In the following discussion, a general description of the system and its components is provided, followed by a discussion of the operation of the same.

Figure 1A:
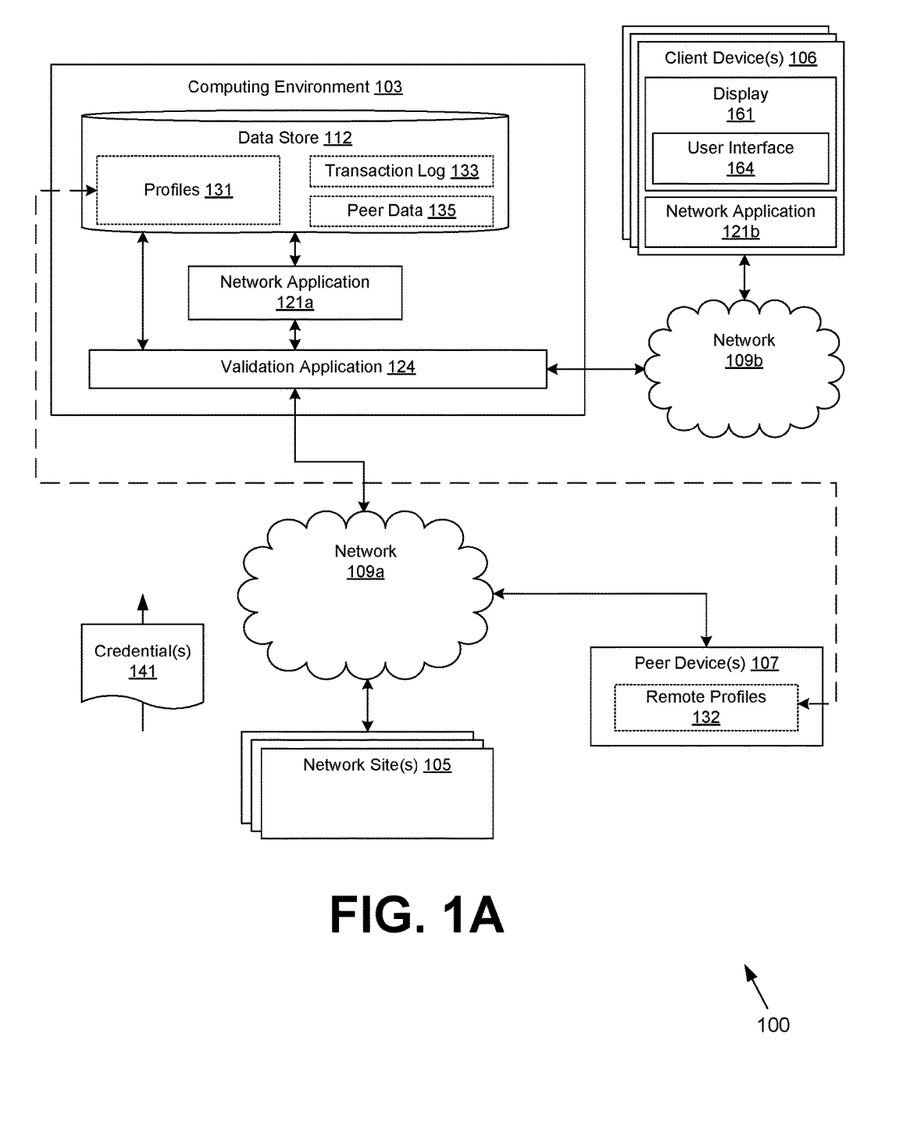
FIGS. 1A and 1B are drawings of a networked environment according to various embodiments of the present disclosure.

With reference to FIG. 1A, shown is a networked environment 100 according to various embodiments. The networked environment 100 includes a computing environment 103, a network site 105, a client device 106, and a peer device 107, which are in data communication with each other via networks 109a and 109b. The networks 109a and 109b include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. In some embodiments, these applications may be executed within a server service implemented in the computing environment 103. The server service may be implemented as a virtual machine capable of executing applications in order to serve requests received in the networked environment 100. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a network application 121a, a validation application 124, and other applications, services, processes, systems, engines, or functionality not discussed in detail herein. The network application 121a may be executed, for example, to transmit and receive data via a communication session over the network 109 with a network site 105 and/or other servers. The communication session may use one or more protocols such as hypertext transfer protocol (HTTP), HTTP Secure (HTTPS), simple object access protocol (SOAP), representational state transfer (REST), user datagram protocol (UDP), transmission control protocol (TCP), and/or other possible protocols. A portion of the communication session with the network site 105 may be authenticated and/or encrypted using secure sockets layer/transport layer security (SSL/TLS), such as may be used for the HTTPS protocol, and/or other protocols as can be appreciated.

The validation application 124 is executed in order to validate the identity of the network sites 105 with which the communication sessions are undertaken by the computing environment 103 and client devices 106. To this end, the validation application 124 may compare characteristics of the network site 105 during the current communication session to the characteristics specified by profile for the network site 105. The characteristics may include the behavior and data communicated by the network site 105 that may be used to establish the communication session. The known characteristics, responsive actions, and/or other associated data for a network site 105 may be collected to create or update a profile for the network site 105.

The data stored in the data store 112 includes, for example, profiles 131, transaction logs 133, peer data 135, and potentially other data. The individual profiles of the profiles 131 may include various characteristics of a network site 105 such as, for example, digital certificates, issuing certificate authorities, protocol versions, offered or negotiated communication session options, distrusted certificate authorities, network address(es), source(s) of the profile 131, and/or other data as can be appreciated. The transaction log 133 comprises a log of data generated by the validation service 124. The transaction log 133 may include data associated with logging issues detected with communication sessions, actions undertaken in response to the issues, changes to the profiles 131, sharing profiles with peers 107, and/or other possible data. The peer data 135 specifies various identifying data associated with the peer device(s) 107 with which profiles 131 may be exchanged. The peer data 135 may comprise names, network addresses, digital certificates, public keys, private keys, shared keys, and/or other types of credentials as can be appreciated.

The network site 105 may be implemented by, for example, a server computer or any other system providing network content and services via the network 109a. Each of the network sites 105 comprises various data associated with a distinct network presence, such as a website, that may be accessible through the network 109a. In order to establish a communication session with a network site 105, the network site 105 may provide one or more credentials 141. The credentials 141 for each network site 105 may include X.509 digital certificates, public keys, private keys, shared keys, and/or other types of credentials as can be appreciated.

The client 106 is representative of a plurality of client devices that may be coupled to the network 109b. The client 106 may comprise, for example, a processor-based system such as a computer system. Such a computer system may be embodied in the form of a server, a desktop computer, a laptop computer, personal digital assistants, cellular telephones, smartphones, set-top boxes, music players, web pads, tablet computer systems, game consoles, electronic book readers, or other devices with like capability. The client 106 may include a display 161. The display 161 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 106 may be configured to execute various applications such as a network application 121b and/or other applications. The network application 121b may be executed in a client 106, for example, to access network content served up by the computing environment 103, network sites 105, and/or other servers, thereby rendering a user interface 164 on the display 161. To this end, the network application 121b may comprise, for example, a browser, a dedicated application, etc., and the user interface 164 may comprise a network page, an application screen, etc. The client 106 may be configured to execute applications beyond the network application 121b such as, for example, email applications, social networking applications, word processors, spreadsheets, and/or other applications.

The peer device 107 is a server computer or any other system storing remote profiles 132 that may facilitate validating network sites 105. The individual profiles of the remote profiles 132 may include various characteristics of a network site 105 such as, for example, digital certificates, issuing certificate authorities, protocol versions, offered or negotiated communication session options, distrusted certificate authorities, network address(es), source(s) of the profile 131, and/or other data as can be appreciated. The peer device 107 may be a member of a set of trusted peers among which various individual profiles may be exchanged and modified. The peer device 107 may generate and share the individual profiles with other members of the trusted peers based upon all or a portion of the remote profiles 132. The remote profiles 132 may in turn be created and/or modified based on previously observed communication sessions with the network sites 105.

Next, a general description of the operation of the various components of the networked environment 100 is provided. To begin, an operator of the network application 121 executed in the computing environment 103 or client 106 initiates a communication session with a network site 105. The validation application 124 may examine the communication session in order to determine the particular network site 105 with which the communication session is occurring. Once the requested network site 105 is identified, the validation application 124 may identify a profile 131 for the network site 105. In some embodiments, a portion of the profiles 131 are obtained from peer devices 107 via the network 109a. The peer devices 107 may share profiles 131 that comprise portions of remote profiles 132 that may be created or obtained by the peer device 107.

Thereafter or concurrent with identifying a profile 131 for the network site 105, various options and other data for the communication session may be exchanged, offered, and/or negotiated between the network site 105 and the network application 121. The behavior and data communicated by the network site 105 during this communication session are characteristics that may act as a fingerprint with which the identity of the network site 105 may be validated.

For example, the communication session may be carried out using the HTTPS protocol, which employs SSL/TLS to provide authentication, confidentiality, and potentially other services. Using the SSL/TLS protocol, the network site 105 may provide the client device 106 with a credential 141, such as a digital certificate. The digital certificate may comprise an identifier for the network site 105, which may traditionally be used for authentication. However, other data associated with the digital certificate may also be used as validation characteristics, such as the issuing certificate authority, the date of issuance/expiration, a cryptographic hash value computed on a portion of the digital certificate, and potentially other data as can be appreciated. Additionally, data associated with SSL/TLS protocol options for the network site 105 may also be used as validation characteristics, such as, for example, the protocol version, supported cipher suites, renegotiation support, and/or other possibilities. In this way, changes to the network site 105 may be identified and considered during validation that are beyond the traditional SSL/TLS authentication mechanisms.

The characteristics of the particular network site 105 with which the communication session is to be established may then be compared to the various characteristics for the network site 105 that have been compiled into a profile 131 over the course of one or more previous communication sessions. For example, the profile 131 for the network site 105 may specify the identity of one or more issuing certificate authorities for digital certificates encountered during prior communication sessions with the network site 105. For the current communication session, a credential 141 provided by the network site 105 may be a digital certificate having an issuing certificate authority specified by the certificate. The validation application may compare the issuing certificate authority for the current certificate to the one or more issuing certificate authorities for the prior communication sessions in order to detect any discrepancies.

As a result of an identified discrepancy, the validation application may initiate one or more actions as may be specified by the profile 131 used for the network site 105. For example, an action may be to send a notice to the client 106 and/or a user associated with the client 106. Additionally, the profile 131 may specify that some discrepancies warrant an immediate action such that the validation application 124 may interrupt the communication session.

However, the existence of a discrepancy may not be conclusive that a network site 105 is compromised or that the device with which the communication session is established is not the intended network site 105. Therefore, in some embodiments, the profiles 131 may specify a weight associated with any characteristic which may be compared. As a result, one or more of the actions specified in a profile 131 may be based on the collective weight of the discrepancies. For example, while a discrepancy identified concerning one authentication characteristic may not be particularly significant, if the characteristic is one of ten "insignificant" characteristics for which a discrepancy exists, the action initiated may be different in light of the totality of characteristics.

In some embodiments, a profile 131 may include characteristics that are independent from historical characteristics of a network site 105. For example, if a credential 141 of a current communication session is a digital certificate issued by a certificate authority that has recently been compromised, this characteristic may be acted upon regardless of whether prior communication sessions with the network site 105 used digital certificates from the same, now compromised, certificate authority.

In addition, the profile 131 for the network site 105 may be updated based on any discrepancy identified between characteristics of the current communication session and the characteristics referenced in the profile 131. In some embodiments, discrepancies may be identified as unconfirmed within the given profile 131 until the discrepancies have been confirmed as a legitimate change in the network site 105. Once updated, the profile 131 for the network site 105 may be made available for distribution to peer devices 107 via the network 109*a*.

Figure 1B:
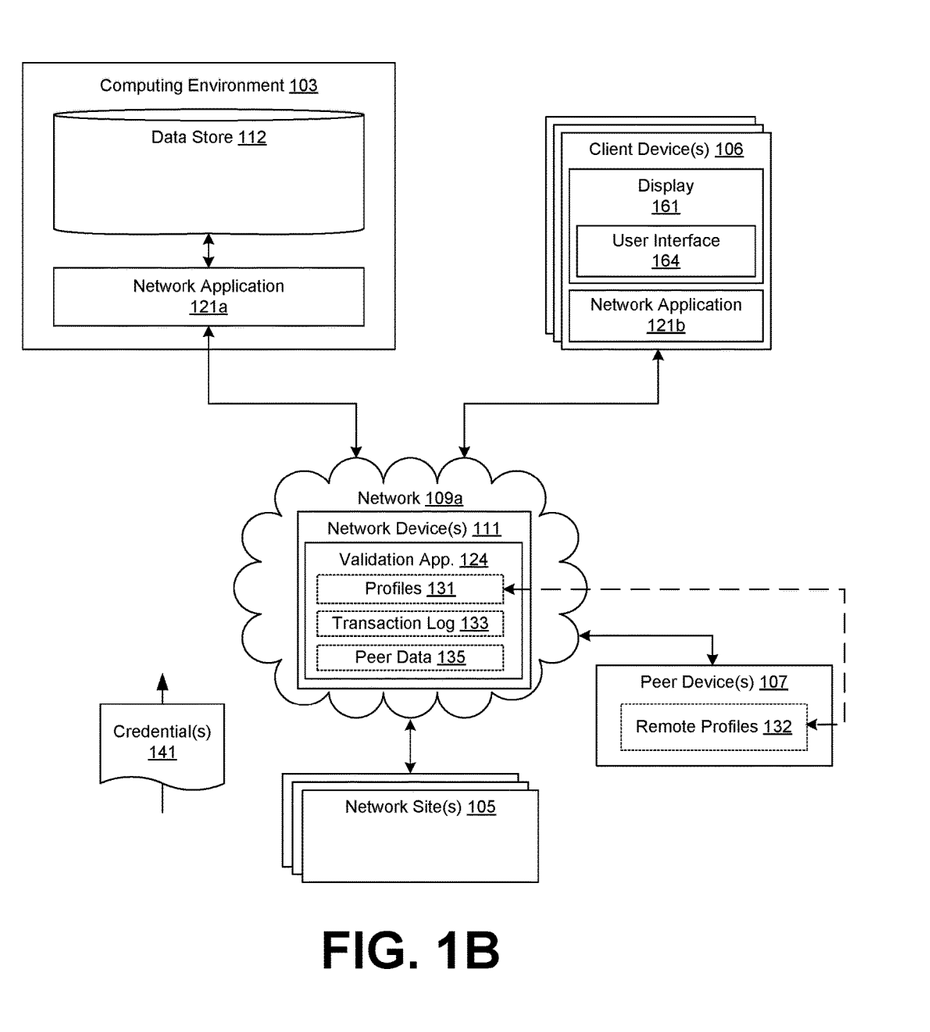

Referring next to FIG. 1B, shown are other embodiments of the networked environment 100 described above in FIG. 1A. The networked 100 includes a computing environment 103, a network site 105, a client device 106, a peer device 107, and a network device 111, which are in data communication with each other via the network 109*a*.

The network device 111 is representative of a plurality of network devices that may forward and/or examine communication data transiting the network 109*a*. The network device 111 may comprise, for example, a processor-based system such as a computer system or other computing device. Such a computer system may be embodied in the form of a server, network router, a network switch, a network proxy, a firewall, or other devices with like capability. The components executed on the network device 111, for example, include a validation application 124, and other applications, services, processes, systems, engines, or functionality not discussed in detail herein. The data stored in the network device 111 includes, for example, profiles 131, transaction logs 133, peer data 135, and potentially other data.

In operation, the network application 121 executed in the computing environment 103 or client 106 initiates a request for a communication session with a network site 105. The validation application 124 executing in the network device 111 may examine the communication session in order to determine the particular network site 105 with which the communication session is requested. Once the network site 105 is identified, the validation application 124 may identify a profile 131 for the network site 105. In some embodiments, a portion of the profiles 131 are obtained from peer devices 107 via the network 109*a*. The peer devices 107 may share profiles 131 that comprise portions of remote profiles 132 that may be created or obtained by the peer device 107.

Thereafter or concurrent with identifying a profile for the network site 105, various options and other data for the communication session may be exchanged, offered, and/or negotiated between the network site 105 and the network application 121. The behavior and data communicated by the network site 105 during this communication session are characteristics that may act as a fingerprint with which the identity of the network site 105 may be validated.

The characteristics of the particular network site 105 with which the communication session is established may then be compared to the various characteristics for the network site 105 that have been compiled into a profile 131 over the course of one or more previous communication sessions. As a result of an identified discrepancy, the validation application 124 may initiate one or more actions as may be specified by the profile 131 used for the network site 105. In some embodiments, a profile 131 may include factors that are independent from historical characteristics of a network site 105. For example, if a credential 141 of a current communication session is a digital certificate issued by a certificate authority that has recently been compromised, this characteristic may be acted upon regardless of whether prior communication sessions with the network site 105 used digital certificates from the same, now compromised, certificate authority.

In addition, the profile 131 for the network site 105 may be updated based on any discrepancy identified between characteristics of the current communication session and the characteristics referenced in the profile 131. In some embodiments, discrepancies may be identified as unconfirmed within the given profile 131 until the discrepancies have been confirmed as a legitimate change in the network site. Once updated, the profile 131 for the network site 105 may be made available for distribution to peer devices 107 via the network 109*a*.

Figure 2:
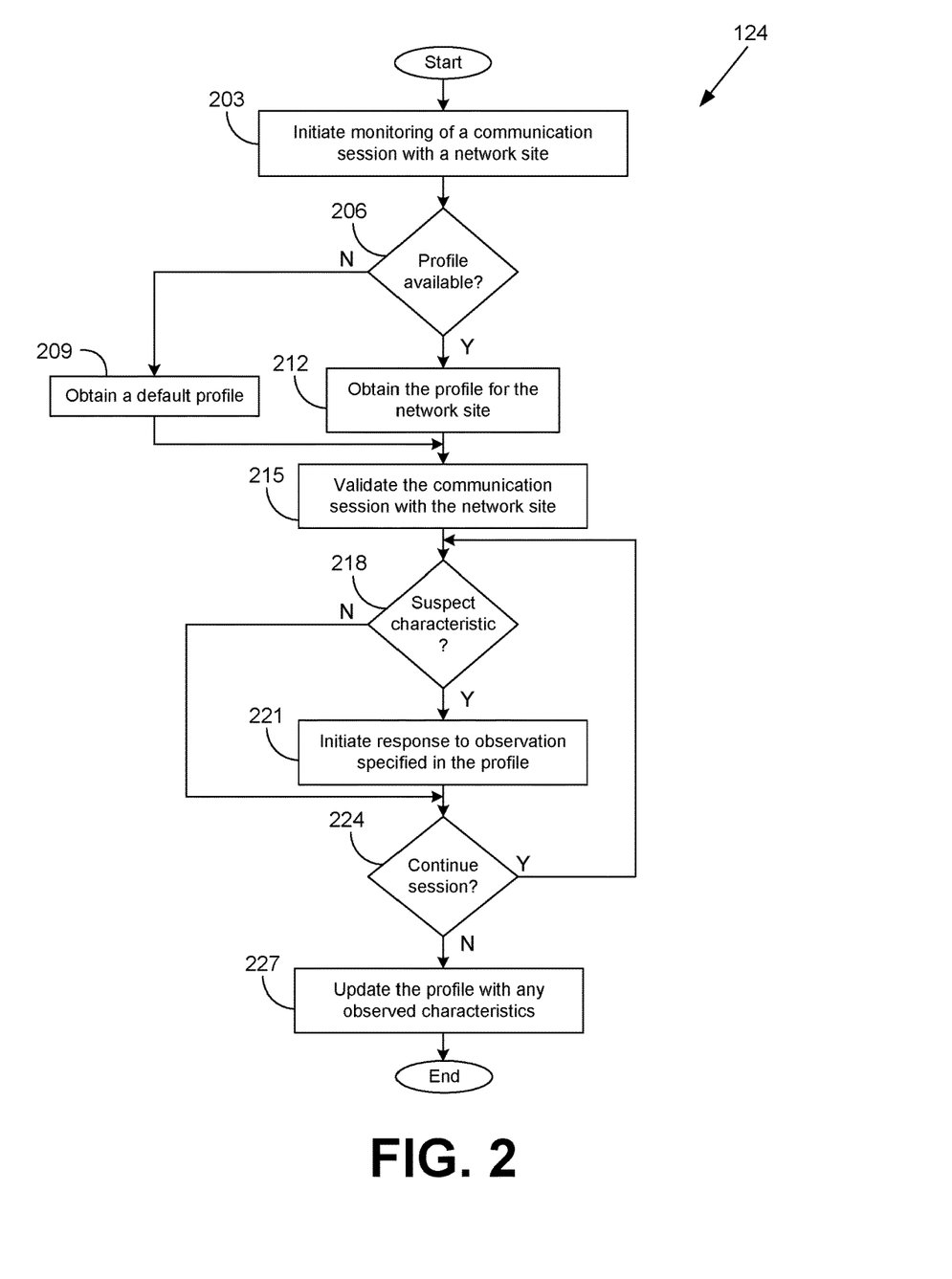
FIG. 2 is a flowchart illustrating one example of functionality implemented as portions of a validation application executed in a computing device in the networked environment of FIGS. 1A and 1B according to various embodiments of the present disclosure.

Referring next to FIG. 2, shown is a flowchart that provides one example of the operation of at least a portion of the validation application 124 according to various embodiments. It is understood that the flowchart of FIG. 2 provides merely an example of the many different types of functional arrangements that may be employed to implement the operation of the portion of the validation application 124 as described herein. As an alternative, the flowchart of FIG. 2 may be viewed as depicting an example of elements of a method implemented in the computing environment 103 (FIG. 1A) or network device 111 (FIG. 1B) according to one or more embodiments.

As shown in FIG. 2, this portion of the execution of the validation application 124 may be initiated in response to the computing environment 103 and/or client device 106 (FIG. 1A) attempting to establish a communication session with a network site 105. Beginning with block 203, the validation application 124 may initiate monitoring of the communication session with the network site 105. The communication session may be carried out according to one or more protocols such as HTTP, HTTPS, SSL/TLS, SOAP, REST, UDP, TCP, and/or other possible protocols. The validation application 124 may examine the communication session in order to determine the particular network site 105 (FIG. 1A) with which the communication session is occurring.

Next, in block 206, the validation application 124 determines whether a profile 131 (FIG. 1A) is locally available for the network site 105. The particular profile 131 for the network site 105 may have been previously created based upon one or more prior communication sessions with the network site 105. In the event a profile 131 for the network site 105 is not available, in block 209, the validation application 124 may use a default profile 131 which may also serve as a template from which a profile 131 may be created for the particular network site 105. The default profile 131 may include characteristics that are not based upon historical observations of communications sessions with the network site 105 such as, for example, certificate revocation lists, known suspicious or compromised certificate authorities, or other such possible characteristics as can be appreciated.

Alternatively, if a profile for the network site 105 is available, in block 212, the validation application may obtain the specific profile 131 for the network site 105. The profile 131 may comprise a historical record of various characteristics of the network site 105 accumulated over the course of one or more prior communication sessions with the network site 105. These characteristics are behaviors exhibited and data communicated by the network site 105 that may act as a fingerprint with which the identity of the network site 105 may be validated.

Next, in block 215, the validation application 124 may validate the communication session occurring with the network site 105. During this communication session, various options and other data for the communication session may be exchanged, offered, and/or negotiated between the network site 105 and the network application 121. The behavior and data communicated by the network site 105 during this communication session are characteristics that may be used to validate the identity of the network site 105.

For example, the communication session may be carried out using the HTTPS protocol, which employs SSL/TLS to provide authentication, confidentiality, and potentially other services. Using the SSL/TLS protocol, the network site 105 may provide the client device 106 with a credential 141 (FIG. 1A), such as a digital certificate, that may be used by the validation application 124 to authenticate the network site 105. The credential 141 may comprise an identifier for the network site 105, which may traditionally be used for authentication. However, other data associated with the digital certificate may also be used as characteristics for authentication, such as the issuing certificate authority, the date of issuance/expiration, a cryptographic hash computed on a portion of the digital certificate, and potentially other data as can be appreciated.

The characteristics of the particular network site 105 with which the communication session is established may then be compared to corresponding characteristics for the network site 105 that have been compiled into a profile 131 over the course of one or more previous communication sessions. For example, the profile 131 for the network site 105 may specify "TrustCo" as the issuing certificate authority for digital certificates encountered during prior communication sessions with the network site 105. For the current communication session, a credential 141 provided by the network site 105 may be a digital certificate issued by "RogueCo" as specified by the certificate. The validation application 124 may compare the issuing certificate authority for the current certificate to the issuing certificate authority for the prior communication sessions in order to detect any discrepancies.

In some embodiments, a profile 131 may include characteristics that are independent from historical characteristics of a network site 105. For example, if a credential 141 of a current communication session is a digital certificate issued by a certificate authority that has recently been compromised, this characteristic may be acted upon regardless of whether prior communication sessions with the network site 105 used digital certificates from the same, now compromised, certificate authority.

Moving on, in block 218, the validation application determines whether any suspect characteristics are present based upon a comparison of the characteristics of the current communication session and the corresponding characteristics captured in the profile 131. The suspect characteristics may include discrepancies identified between the characteristics of the current communication session and the previously observed characteristics. Suspect characteristics may also include similarities between the characteristics of the current communication session and generally known characteristics indicating the network site 105 has security vulnerabilities or has been compromised.

As described above, the characteristics of the profile may be based on prior communication sessions with the network site 105 and/or from characteristics that are independent from historical observations of communication sessions with the network site 105. As an example of the latter, a profile 131 may specify that a computer infected with malware may set a particular value within the type of service (ToS) field within the Internet protocol (IP) header. Therefore, if the current communication session has this value in ToS field, this would be a suspect characteristic for the communication session.

If no suspect characteristic has been observed, then execution of the validation application 124 may proceed to block 224. Alternatively, if a suspect characteristic has been observed, in block 221, the validation application 124 may initiate a responsive action based upon the one or more suspect characteristics. The existence of a suspect characteristic may not be conclusive that a network site 105 is compromised or that the device with which the communication session is established is not the intended network site 105. For example, a change in the issuing certificate authority of a digital certificate for a network site 105 may be identified as a suspect characteristic, but such a change occasionally occurs during the normal course of operation of a network site 105.

Therefore, in some embodiments, the profiles 131 may specify a weight associated with any characteristic which may be compared. As a result, one or more of the actions specified in a profile 131 may be based on the collective weight of the discrepancies or other suspect characteristics. For example, while a discrepancy with one characteristic may not be particularly significant, if the characteristic is one of ten "insignificant" characteristic for which a discrepancy exists, the action initiated may be different in light of the totality of characteristics. As a result of the suspect characteristic(s), the validation application 124 may initiate one or more actions as may be specified by the profile 131 used for the network site 105. For example, an action may be to send a notice to the client 106 and/or a user associated with the client 106. Additionally, the profile 131 may specify that suspect characteristics warrant an immediate action such that the validation application 124 may interrupt the communication session. In some embodiments, these actions may be initiated by sending a notification and/or storing data associated with the validation in a data store, such as the data store 112 (FIG. 1A).

As another example, a profile 131 for a network site 105 may specify different weights for, among other possibilities, a change in the issue date of a digital certificate for the network site, a change in the network address for the network site 105, and a change the SSL/TLS options offered by the network site 105. The profile 131 may further specify predefined thresholds for various actions based on the total of the weights for matching characteristics, such as, a threshold to log the characteristic(s) in the transaction log 133 (FIG. 1A), a threshold to transmit a notice, and a threshold to interrupt the communication session. In this example, if all three suspect characteristics matched, the total weight may be sufficient to warrant interrupting of the communication session. However, if, for example, only the issue date of the digital certificate had changed, the weight for this suspect characteristic alone may only warrant logging the characteristic.

Continuing, in block 224, the validation application 124 determines whether this portion of the execution should continue. The determination may be based on the continued existence of the communication session to be validated, upon characteristics and/or actions specified by the profile 131, and potentially other factors as can be appreciated. If execution of the validation application 124 is to continue, execution returns to block 218.

Alternatively, if execution of this portion of the validation application 124 is to end, in block 227, the profile 131 for the network site 105 may be updated with characteristics observed during the communication session, as well as any discrepancy identified between characteristics of the current communication session and the characteristics referenced in the profile 131. In some embodiments, discrepancies may be identified as unconfirmed within the given profile 131 until the discrepancies have been confirmed as a legitimate change in the network site 105. Thereafter, this portion of the execution of the validation application 124 ends as shown.

Figure 3:
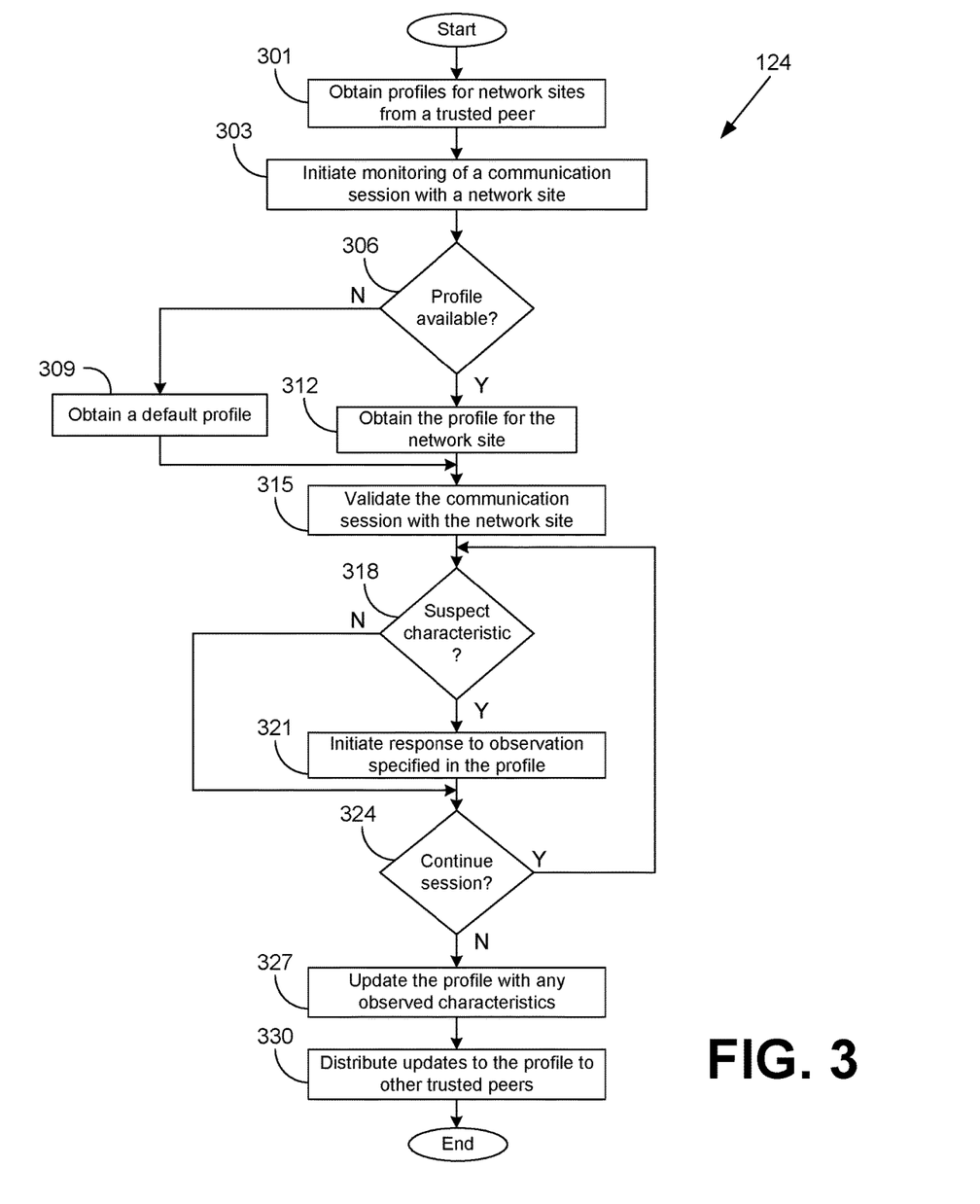
FIG. 3 is a flowchart illustrating another example of functionality implemented as portions of a validation application executed in a computing device in the networked environment of FIGS. 1A and 1B according to various embodiments of the present disclosure.

Turning now to FIG. 3, shown is shown is a flowchart that provides another example of the operation of at least a portion of the validation application 124 according to various embodiments. It is understood that the flowchart of FIG. 3 provides merely an example of the many different types of functional arrangements that may be employed to implement the operation of the portion of the validation application 124 as described herein. As an alternative, the flowchart of FIG. 3 may be viewed as depicting an example of elements of a method implemented in the computing environment 103 (FIG. 1A) or network device 111 (FIG. 1B) according to one or more embodiments.

As shown in FIG. 3, this portion of the execution of the validation application 124 may be initiated in response to the computing environment 103 and/or client device 106 (FIG. 1A) attempting to establish a communication session with a network site 105 (FIG. 1A). Beginning with block 301, the validation application 124 obtains or has previously obtained a portion of the profiles 131 that are stored locally from peer devices 107 (FIG. 1A) via the network 109 (FIG. 1A). The portion of the profiles 131 may be derived from the remote profiles 132 (FIG. 1A) that may be created or obtained by the peer device 107. The peer devices 107 that makeup a set of trusted peers may be defined and identified in the peer data 135 (FIG. 1A).

Next, in block 303, the validation application 124 may initiate monitoring of the communication session with the network site 105. The communication session may be carried out according to one or more protocols such as HTTP, HTTPS, SSL/TLS, SOAP, REST, UDP, TCP, and/or other possible protocols. The validation application 124 may examine the communication session in order to determine the particular network site 105 with which the communication session is requested.

Next, in block 306, the validation application determines whether a profile 131 is locally available for the network site 105. The particular profile 131 for the network site 105 may have been previously created, either locally or in a peer device 107, based upon one or more prior communication sessions with the network site 105. In the event a profile 131 for the network site 105 is not available, in block 309, the validation application 124 may use a default profile 131 which may also serve as a template from which a profile 131 may be created for the particular network site 105. The default profile 131 may include characteristics that are not based upon historical observations of communications sessions with the network site 105 such as, for example, certificate revocation lists, known suspicious or compromised certificate authorities, or other such possible characteristics as can be appreciated.

Alternatively, if a profile for the network site 105 is available, in block 312, the validation application may obtain the specific profile 131 for the network site 105. The profile 131 may comprise a historical record of various characteristics of the network site 105 accumulated over the course of one or more prior communication sessions with the network site.

Next, in block 315, the validation application 124 may validate the communication session occurring with the network site 105. During this communication session, various options and other data for the communication session may be exchanged, offered, and/or negotiated between the network site 105 and the network application 121. The behavior and data communicated by the network site 105 during this communication session are characteristics that may be collectively used to identify a network site 105.

Moving on, in block 318, the validation application 124 determines whether any suspect characteristics are present based upon a comparison of the characteristics of the current communication session and the corresponding characteristics captured in the profile 131. As described above, the characteristics of the profile may be based on prior communication sessions with the network site 105 and/or from characteristics that are independent from historical observations of communication sessions with the network site.

If no suspect characteristic has been observed, then execution of the validation application 124 may proceed to block 324. Alternatively, if a suspect characteristic has been observed, in block 321, the validation application 124 may initiate a responsive action based upon the one or more suspect characteristics. The existence of a suspect characteristic may not be conclusive that a network site 105 is compromised or that the device with which the communication session is established is not the intended network site 105.

Therefore, in some embodiments, the profiles 131 may specify a weight associated with any characteristic which may be compared. As a result, one or more of the actions specified in a profile 131 may be based on the collective weight of the discrepancies. As a result of the suspect characteristic(s), the validation application 124 may initiate one or more actions based on suspect characteristics, individually and/or collectively, as may be specified by the profile 131 used for the network site 105.

With regard to a prior example described in reference to FIG. 2, the profiles 131 may specify weights, for example, ranging from 1 (least significant) to 100 (most significant). The profile 131 for the network site 105 may specify, among other possibilities, that a change in the issue date of a digital certificate for the network site has a weight of 5, a change in the network address for the network site 105 has a value of 20, and a change the SSL/TLS options offered by the network site 105 has a value of 25. The profile 131 may further specify predefined thresholds for various actions based on the total of the weights for matching characteristics such as, for example, log the characteristic(s) in the transaction log 133 (FIG. 1A) if the total weight is 10 or less, transmit a notice if the total weight is 20 or less, and interrupt the communication session if the total weight is 50 or less. In this example, if all three suspect characteristics matched, the total weight would be 50 (5+20+25), resulting in an interruption of the communication session. However, if, for example, only the issue date of the digital certificate had changed, this suspect characteristic would have only been logged since the total weight would be 5.

Then, in block 324, the validation application 124 determines whether this portion of the execution should continue. The determination may be based on the continued existence of the communication session to be validated, upon characteristics and/or actions specified by the profile 131, and potentially other factors as can be appreciated. If execution of the validation application 124 is to continue, execution returns to block 318.

Alternatively, if execution of this portion of the validation application 124 is to end, in block 327, the profile 131 for the network site 105 may be updated with characteristics observed during the communication session, as well as any discrepancy identified between characteristics of the current communication session and the characteristics referenced in the profile 131. In some embodiments, discrepancies may be identified as unconfirmed within the given profile 131 until the discrepancies have been confirmed as a legitimate change in the network site 105. Next, in block 330, the validation application 124 may distribute the updated profile 131 to other members of the set of trusted peers. Thereafter, this portion of the execution of the validation application 124 ends as shown.

Figure 4:
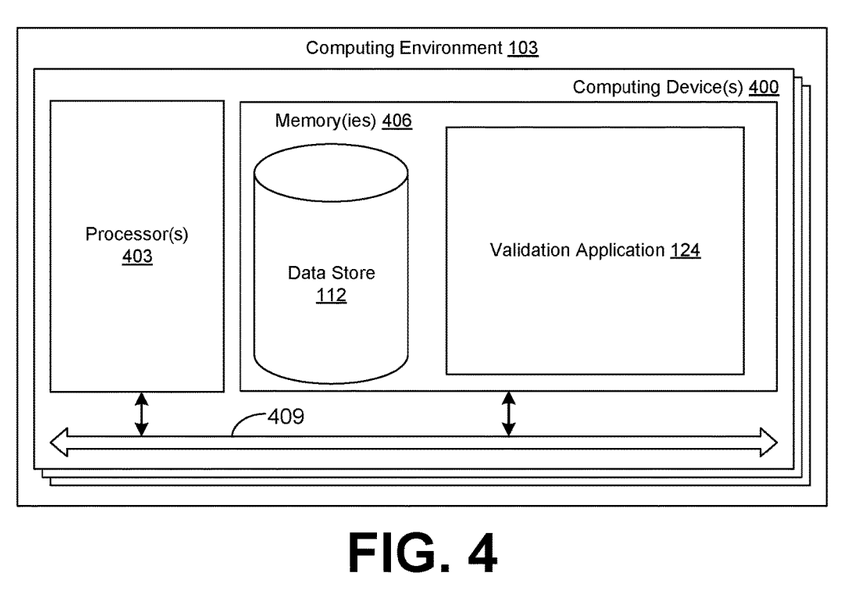
FIG. 4 is a schematic block diagram that provides one example illustration of a computing environment employed in the networked environment of FIGS. 1A and 1B according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Figure 5:
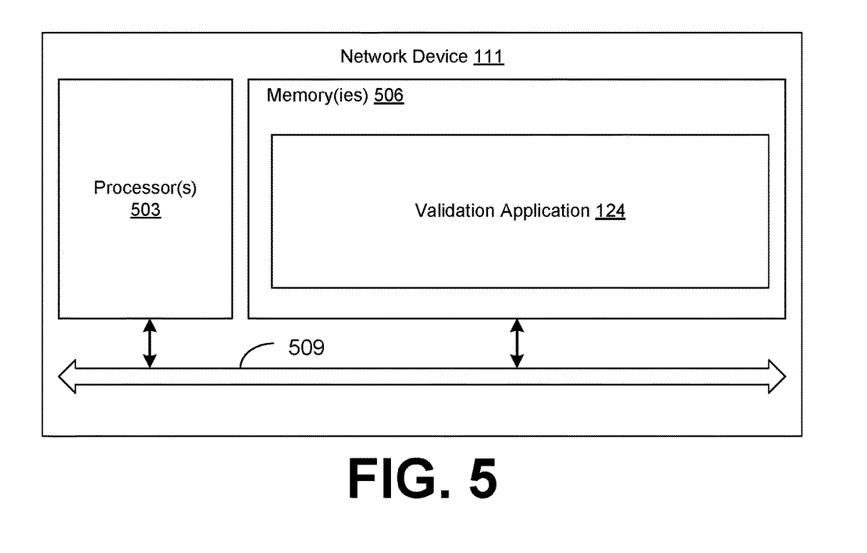
FIG. 5 is a schematic block diagram that provides one example illustration of a network device employed in the networked environment of FIG. 1B according to various embodiments of the present disclosure.

With reference to FIG. 5, shown is a schematic block diagram of the network device 111 according to an embodiment of the present disclosure. The network device 111 includes at least one processor circuit, for example, having a processor 503 and a memory 506, both of which are coupled to a local interface 509. The local interface 509 may comprise, for example, a data bus with an accompanying address/control bus or other bus structure as can be appreciated.

With reference to both FIGS. 4 and 5, stored in the memory 406, 506 are both data and several components that are executable by the processor 403, 503. In particular, stored in the memory 406, 506 and executable by the processor 403, 503 are the validation application 124, and potentially other applications. Also stored in the memory 406 may be a data store 112 and other data. In addition, an operating system may be stored in the memory 406, 506 and executable by the processor 403, 503.

It is understood that there may be other applications that are stored in the memory 406, 506 and are executable by the processor 403, 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406, 506 and are executable by the processor 403, 503. In this respect, the term "executable" means a program file that is in a form that can ultimately be run by the processor 403, 503. Examples of executable programs may be, for example, a compiled program that can be translated into machine code in a format that can be loaded into a random access portion of the memory 406, 506 and run by the processor 403, 503, source code that may be expressed in proper format such as object code that is capable of being loaded into a random access portion of the memory 406, 506 and executed by the processor 403, 503, or source code that may be interpreted by another executable program to generate instructions in a random access portion of the memory 406, 506 to be executed by the processor 403, 503, etc. An executable program may be stored in any portion or component of the memory 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406, 506 is defined herein as including both volatile and nonvolatile memory and data storage components. Volatile components are those that do not retain data values upon loss of power. Nonvolatile components are those that retain data upon a loss of power. Thus, the memory 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403, 503 may represent multiple processors 403, 503 and/or multiple processor cores and the memory 406, 506 may represent multiple memories 406, 506 that operate in parallel processing circuits, respectively. In such a case, the local interface 409, 509 may be an appropriate network that facilitates communication between any two of the multiple processors 403, 503, between any processor 403, 503 and any of the memories 406, 506, or between any two of the memories 406, 506, etc. The local interface 409, 509 may comprise additional systems designed to coordinate this communication, including, for example, performing load balancing. The processor 403, 503 may be of electrical or of some other available construction.

Although the validation application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the validation application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403, 503 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the validation application 124, that comprises software or code can be embodied in any non-transitory computer-readable medium for use by or in connection with an instruction execution system such as, for example, a processor 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the validation application 124, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same network device 111, computing device 400, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
   a computing device coupled to a network, the computing device comprising a memory;
   an application executable in the computing device, the application causing the computing device to establish a communication session with a network site, the communication session being established via the network using a credential associated with the network site; and
   a validation service executable in the computing device, the validation service causing the computing device to at least:
      perform a validation of the communication session based at least in part upon a comparison of an historical profile associated with the credential and a plurality of observed characteristics of the communication session, the historical profile being derived from a set of historical characteristics captured in a plurality of previous communication sessions by a set of trusted peers, wherein the set of historical characteristics is based at least in part on the credential presented by the network site and at least one transport layer security (TLS) options associated with the previous communication sessions; and
      in response to the validation indicating a discrepancy between the historical profile and the communication session, determine a collective weight of the discrepancy based upon a respective weighting of individual ones of the set of historical characteristics; and
      initiate an action specified by the historical profile in response to the collective weight of the discrepancy meeting a threshold.

2. The system of claim 1, wherein the historical profile comprises a cryptographic hash value of the credential.

3. The system of claim 1, wherein the action is initiated in response to obtaining a revocation associated with a certificate authority.

4. The system of claim 1, wherein the historical profile comprises a plurality of known characteristics of a site associated with the credential, and the collective weight is determined from a total of respective weights associated with the known characteristics that differ from the observed characteristics.

5. The system of claim 1, wherein the TLS options comprise at least one of a protocol version, a supported cipher suite, or a renegotiation support parameter.

6. The system of claim 1, wherein individual ones of the set of historical characteristics are individually weighted based upon significance.

7. The system of claim 1, wherein the credential is an X.509 digital certificate and wherein the set of historical characteristics comprising at least one of: an issuing certificate authority, a date of issuance or expiration, or a cryptographic hash value computed on a portion of the credential.

8. The system of claim 1, wherein the historical profile specifies a portion of the credential.

9. The system of claim 1, wherein the validation service further causes the computing device to generate an updated profile based at least in part upon a portion of data communicated during the communication session, the updated profile being transmitted to the set of trusted peers.

10. A method, comprising:
   performing a validation of a communication session with a site based at least in part upon a comparison of an historical profile associated with a credential provided by the site and a plurality of observed characteristics of the communication session, the historical profile being derived from a set of historical characteristics captured in a plurality of previous communication sessions by a set of trusted peers, wherein the set of historical characteristics is based at least in part on the credential presented by the site and at least one of a plurality of transmission control protocol (TCP) options offered by the site during the communication session or at least one transport layer security (TLS) options associated with the plurality of previous communication sessions by the set of trusted peers;
   in response to the validation indicating a discrepancy between the historical profile and the communication session, determining a collective weight of the discrepancy based upon a respective weighting of individual ones of the set of historical characteristics; and
   initiating an action specified by the historical profile in response to the collective weight of the discrepancy meeting a threshold.

11. The method of claim 10, wherein the set of historical characteristics comprises at least one of: an issuing certificate authority, a date of issuance or expiration, or a cryptographic hash value computed on a portion of the credential.

12. The method of claim 10, wherein the historical profile comprises a portion of data exchanged during the plurality of previous communication sessions.

13. The method of claim 10, wherein the historical profile is obtained from a peer computing device, the peer computing device being a member of the set of trusted peers.

14. The method of claim 13, further comprising modifying the historical profile to comprise a portion of data communicated during the communication session, the historical profile that is modified being made available to the set of trusted peers.

15. A non-transitory computer-readable medium embodying a program executable in a computing device, wherein, when executed, the program causes the computing device to at least:
   perform a validation of a communication session with a site based at least in part upon a comparison of an historical profile associated with a credential associated with the site and a plurality of observed characteristics of the communication session, the historical profile being derived from a set of historical characteristics captured in a plurality of previous communication sessions by a set of trusted peers, wherein the set of historical characteristics is based at least in part on the credential presented by the site and at least one transport layer security (TLS) options associated with the plurality of previous communication sessions by the set of trusted peers; and
   in response to the validation indicating a discrepancy between the historical profile and the communication session, determine a collective weight of the discrepancy based upon a respective weighting of individual ones of the set of historical characteristics; and
   initiate an action specified by the historical profile in response to the collective weight of the discrepancy meeting a threshold.

16. The non-transitory computer-readable medium of claim 15, wherein the historical profile comprises a portion of data exchanged during the previous communication sessions, and wherein the set of historical characteristics comprising at least one of: an issuing certificate authority, a date of issuance or expiration, or a cryptographic hash value computed on a portion of the credential.

17. The non-transitory computer-readable medium of claim 15, wherein the historical profile comprises a plurality of known characteristics of the site and the collective weight is determined from a total of respective ones of corresponding weights associated with the known characteristics that differ from the observed characteristics.

18. The non-transitory computer-readable medium of claim 15, wherein the action comprises modifying the historical profile to comprise a portion of data communicated during the communication session and making the historical profile that is modified available to the set of trusted peers.

19. The method of claim 10, wherein the historical profile comprises the at least one transport layer security (TLS) options associated with the plurality of previous communication sessions by the set of trusted peers, and wherein the TLS options comprise at least one of a protocol version, a supported cipher suite, or a renegotiation support parameter.

20. The method of claim 10, wherein the historical profile comprises the plurality of TCP options offered by the site during the communication session, and wherein the plurality of TCP options comprise at least a port number.

* * * * *